M. M. BRICE.
COMBINATION TOOL HANDLE PLIERS.
APPLICATION FILED NOV. 13, 1911.
1,069,106.
Patented Aug. 5, 1913.
2 SHEETS—SHEET 1.
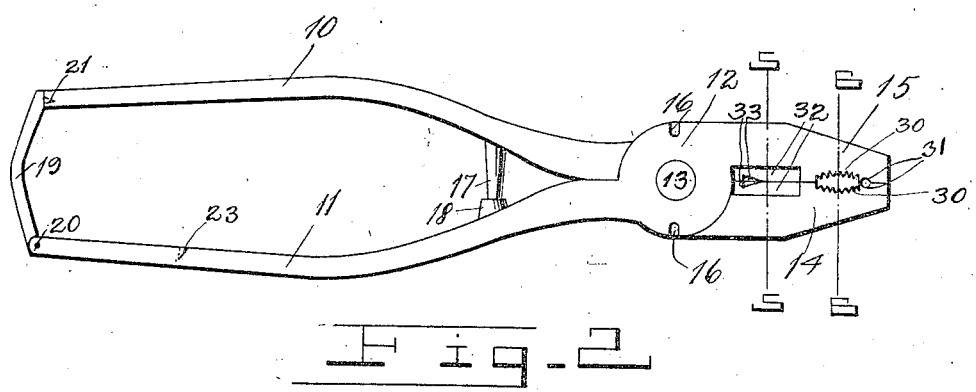
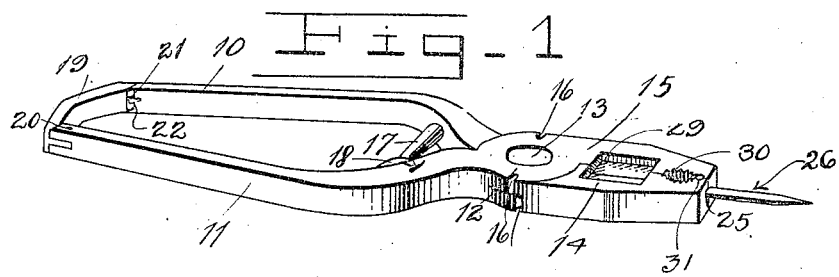
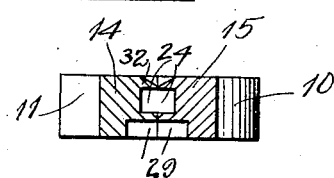
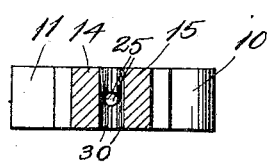
Witnesses
Herbert H. Parter
John E. Burch
Inventor
M. M. Brice
Attorney

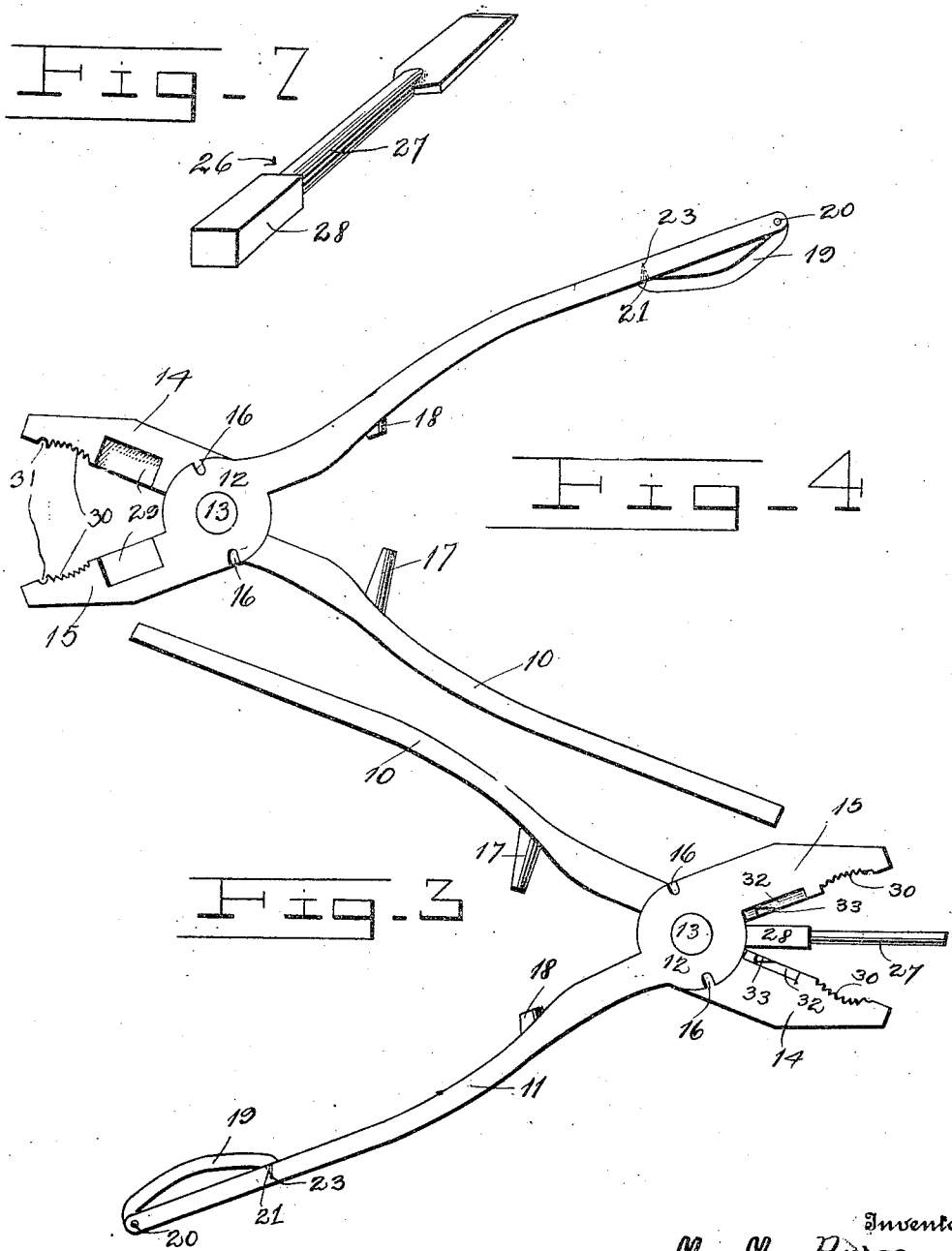

UNITED STATES PATENT OFFICE.

MICHAEL M. BRICE, OF SAVANNAH, GEORGIA.

COMBINATION-TOOL-HANDLE PLIERS.

1,069,106.  Specification of Letters Patent.  Patented Aug. 5, 1913.

Application filed November 13, 1911. Serial No. 660,012.

*To all whom it may concern:*

Be it known that I, MICHAEL M. BRICE, a citizen of the United States, residing at Savannah, in the county of Chatham, State of Georgia, have invented certain new and useful Improvements in Combination-Tool-Handle Pliers; and I do hereby declare the following to be a full, clear, and exact description of the invention, such as will enable others skilled in the art to which it appertains to make and use the same.

This invention relates to combination tools and more especially to pliers having a combination of tools formed therewith and arranged in a novel manner to provide a ready and convenient article for various uses.

Another object of the invention is to provide a combination tool in the form of pliers provided with means for holding its handles in a stationary position when its jaws are closed and in which said jaws are constructed with novel form of gripping faces formed in a novel manner for the proper and secure gripping of a tool shank of novel form therebetween whereby the handles of the pliers will serve as a handle for the various tools having their shank portions formed to conform to the shape of the gripping faces of the jaws.

With the above and other objects in view, the invention consists of certain other combinations and arrangements of parts as will be hereinafter more fully described and claimed, it being a still further object of the invention to provide a device which will not be likely to get out of working order.

In the drawings:—Figure 1 is a perspective view of my improved pliers in a closed position and employed as a tool handle for gripping the shank portion of a tool. Fig. 2 is an opposite side elevation thereof in the same position and with the shank removed. Fig. 3 is a side elevation of the device looking toward the same side as shown in Fig. 2 but with the pliers in an open position and with a tool shank inserted in position for use. Fig. 4 is a view similar to Fig. 3 but looking toward the opposite side of the pliers and with the shank removed. Fig. 5 is a sectional view on the line 5—5 of Fig. 2. Fig. 6 is a sectional view on the line 6—6 of Fig. 2. Fig. 7 is a detailed perspective view of a tool shank adapted to be gripped by my improved pliers.

Referring to the drawings in detail, my invention is shown as comprising a pair of handles 10 and 11 which are formed with enlarged head portions 12 pivotally connected as shown at 13 and formed with tapered jaws beyond the pivot point as shown at 14 and 15 respectively. The opposite sides of the enlarged portions 12 at their edges are formed with notches 16 having their opposite edges sharpened to constitute wire cutters while the handle 10 carries a belt punch 17 or other form of punching element adapted to coact with a lug 18 carried by the handle 11 and both projecting inwardly in alinement closely adjacent the pivot point 13 and to coact when the handles are brought to a closed position. A curved clip 19 is pivotally connected as shown at 20 to the free extremity of the handle 11 and at its free extremity carries an inwardly projecting locking point or tooth 21 adapted to engage in a recess 22 formed in the free extremity of the handle 10 to hold the handles in a closed position and form an abutting member adapted to fit the contour of the palm of the hand and permit use of the plier as a tool handle without injury. When the handles are in an open position, said clip 19 is adapted to be pivoted toward the handle 11 and the tooth 21 engaged in a recess 23 in the inner face of the handle 11 to hold the clip against said handle to permit free movement of the handles or to hold said clip out of the way when not desired for use.

The coacting faces of the jaws 14 and 15 are constructed in a novel manner to coact in forming a combination of implements and also to form a socket whereby the shank of a tool may be inserted therein and locked in position by the clip previously described. For this purpose the coacting faces of the jaws are provided with rectangular recesses 24 centrally and longitudinally of their inner portions and communicating with similarly extended semi-circular recesses 25 outwardly of the recesses 24 and communicating with the ends of the jaws for securing a handle shank 26 therein. The handle shank 26 may be that of any known form of tool or implement such as a screw driver, saw, file, chisel, punch, awl, reamer, gimlet, gouge, knife, cork screw, can opener, soldering iron, leather punch, nail puller or any other tool which may be provided with a shank and which is formed with a reduced circular portion 27 intermediate of a rectangular portion 28 at the extremity of the shank and the tool whereby the recesses 24 and 25 will close over the portions 27 and 28 respectively for tightly gripping the same and holding the tool against rotation therein and permitting the various tools to be interchanged at will.

The coacting faces of the jaws at one side of the pliers are provided with rectangular recesses 29 forming a wrench for the engagement of nuts or the like while outwardly of said notches and extending continuously across the jaw faces are a series of corrugations 30 for gripping pipes or circular objects and forwardly of said corrugations 30 which provide biting teeth for tightly gripping a pipe section, are a pair of opposed grooves 31 adapted for gripping wire for splicing the same in an efficient manner, said grooves being disposed inwardly of the ends of the jaws as shown. The opposite side portions of the jaws relative to the sides in which the recesses 29 are formed, are provided with beveled recesses 32 forming sharp engaging edges or cutting blades for wire or the like and which are further formed with opposite triangular recesses 33 adapted to coact for tightly engaging the head of a nail for forming a nail puller.

I wish to have it understood that I may make such changes in the construction of the device as fairly fall within the scope of the appended claims and it is further understood that the device under the statutes is protected for all desirable uses to which it may be put without departing from the spirit of the invention.

I claim:—

1. A tool comprising handle members pivoted together and having clamping jaws formed with intermediate gripping recesses longitudinally thereof and with recesses communicating with their side faces outwardly of the gripping recesses, said jaws having wall portions between the recesses.

2. The combination with pliers consisting of pivoted handles having coacting jaws formed to provide a combination of implements, the free ends of the handles being normally spaced apart when the jaws are in contact; of means for holding said jaws in contact or permitting the same to move apart, consisting in having the extremity of one handle bifurcated and the extremity of the other handle formed with an end recess, the inner face of the first named handle being also provided with a recess and a curved clip pivoted between the bifurcations and having an inwardly extending locking point for interchangeable engagement with the respective recesses to permit the clip to serve as an abutting member for the hand or to hold the same out of the way and allow free movement of the handles.

In testimony whereof, I affix my signature, in presence of two witnesses.

MICHAEL M. BRICE.

Witnesses:
  CHARLIE MATHIS,
  E. F. KRIEGER.